United States Patent [19]

Moberg et al.

[11] 4,451,772

[45] May 29, 1984

[54] PASSIVE CLAMP FOR ON/OFF CONTROL OF A CAPACITOR CHARGER

[75] Inventors: Gregory D. Moberg; Lynn R. Hudson, Rochester, both of N.Y.

[73] Assignee: Eastman Kodak Company, Rochester, N.Y.

[21] Appl. No.: 416,537

[22] Filed: Sep. 9, 1982

[51] Int. Cl.³ ............................................. H02P 13/22
[52] U.S. Cl. ......................................... 320/1; 363/19
[58] Field of Search ............................. 320/1; 363/19; 315/241 P

[56] References Cited

U.S. PATENT DOCUMENTS

| | | | |
|---|---|---|---|
| 3,679,991 | 7/1972 | Wilwerding | 320/1 |
| 3,863,126 | 1/1975 | Colyn | 320/1 |
| 4,068,151 | 1/1978 | Harrison | 315/241 P |
| 4,080,646 | 3/1978 | Dietrich et al. | 363/23 |
| 4,270,079 | 7/1981 | Ikawa | 320/1 |

FOREIGN PATENT DOCUMENTS 1455498  11/1976  United Kingdom ................ 363/19

*Primary Examiner*—William H. Beha, Jr.
*Attorney, Agent, or Firm*—Dennis P. Monteith

[57] ABSTRACT

A clamp device for a switching transistor of a D.C. to D.C. converter is non-conductive when the converter is ON. When the converter is turned OFF, the clamp device is placed in a standby state that clamps off the switching transistor and draws no power from the battery. When noise occurs the clamp device momentarily enables the converter, but only while such noise is present.

5 Claims, 4 Drawing Figures

PASSIVE CLAMP FOR ON/OFF CONTROL OF A CAPACITOR CHARGER

FIELD OF THE INVENTION

This invention relates to a D.C. to D.C. converter for charging an energy-storage capacitor. More particularly, the invention relates to apparatus providing on-/off control for such a converter.

Description Relative to the Prior Art

Commonly, a low-voltage battery-powered D.C. to D.C. converter converts a low battery voltage to a high voltage. The converter can be used, for example, for charging a capacitor to a high level of electrical energy necessary to fire an electronic flash unit. The charging of the capacitor is controlled by a switching element, e.g. an oscillating transistor, connected between the battery and a primary coil of the converter's transformer. The oscillating transistor is alternately turned on and off to control the converter's charging of the capacitor. When the charge voltage of the capacitor reaches a desired level, a control device turns off the oscillating transistor. To prevent noise, e.g. transformer ringing noise, from spuriously turning on the oscillating transistor, a clamp device is also turned on, which shorts the base-emitter junction of the oscillating transistor and clamps off the converter. Because the relatively large base current required to operate the clamp transistor would drain a battery over an extended period of time, the clamp transistor is turned off shortly after the converter has been turned off and the ringing noise has subsided. When the clamp transistor turns off, the base-emitter junction of the oscillating transistor is placed in a high impedance state. This is disadvantageous because, in this state, the converter can be turned on again by electrical noise, e.g. by noise resulting from flash firing.

U.S. Pat. No. 4,270,079 discloses an electronic strobe flash unit in which the clamping device, an SCR, is pulsed off cyclically after the capacitor is completely charged. Thus, even if the converter is turned on again by noise, excessive battery drain will be stopped by the next cyclical turn-off pulse. The disadvantages of this device are that the control circuitry for producing the cyclical turn-off pulses adds to the device complexity, and causes some battery drain.

SUMMARY OF THE INVENTION

The present invention provides a D.C. to D.C. converter having an improved clamp device which is simple, draws no power from the battery when the converter is turned off and prevents electrical noise from enabling the converter except while the noise is actually present. This is accomplished in accordance with the present invention by a clamp device which, when the converter is turned off, is placed in a non-conductive standby state. If the converter is turned on by a noise pulse, the clamp device is momentarily turned on and clamps the current to the base of the converter's switching transistor at a level which is insufficient to maintain the transistor's conduction when the noise ceases. Therefore, the converter remains on only during the duration of the noise.

In a preferred embodiment of the invention, the clamp device comprises a clamp transistor to which a resistor, current regulating means and semiconductor means are coupled so that when the converter is to be turned on, the current regulating means is turned on and the clamp transistor is turned off. When the converter is to be turned off, the current regulating means is turned off. Because of the resistor coupled to it, the clamp transistor assumes a standby state (i.e. non-conductive, but ready to be momentarily enabled by a noise pulse if required) in which it draws no power from the battery. If noise of sufficient magnitude and proper polarity occurs, the converter's switching transistor and the clamp transistor are momentarily turned on. However, the current drawn from the base of the converter's switching transistor is clamped at a low level which is insufficient to drive the switching transistor into heavy conduction necessary to sustain operation of the converter. Consequently, when the noise ceases, the clamp transistor turns off the switching transistor which turns off the converter. After this, the clamp transistor turns off.

The invention and its features and advantages will become more apparent by referring to the accompanying drawings and to the ensuing detailed description of the preferred embodiment.

DETAILED DESCRIPTION OF THE PREFERRED EMBODIMENTS

Because battery powered D.C. to D.C. converters are well known, the present description will be directed in particular to elements forming part of, or cooperating directly with, apparatus in accordance with the present invention. It is to be understood that elements not specifically shown or described may take various forms well known to those having skill in the converter art.

Figure 1:
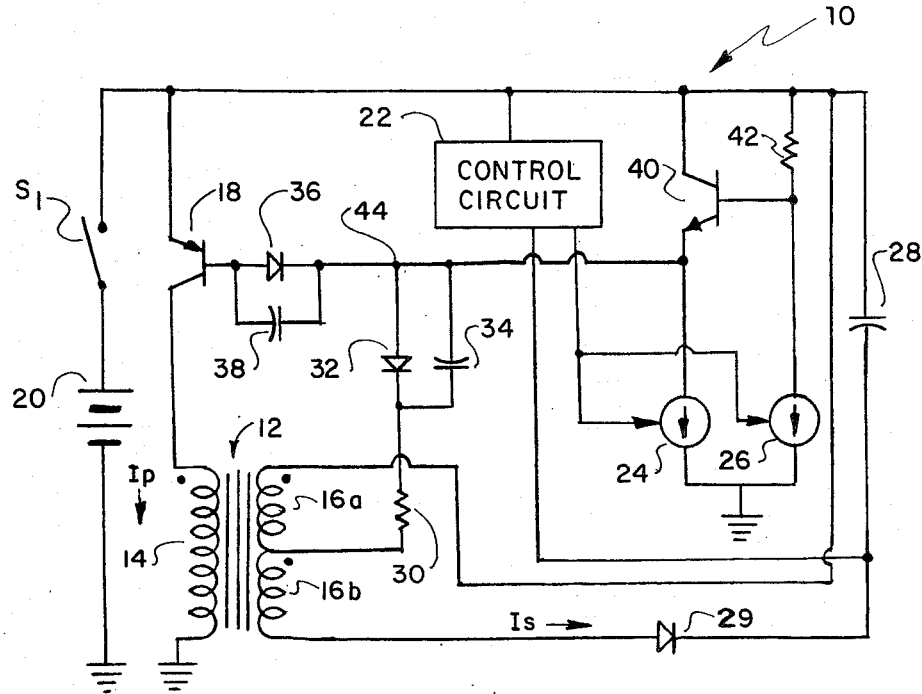
FIG. 1 is a schematic circuit diagram of a battery powered, flyback D.C. to D.C. converter having a turn on/off control according to the invention.

FIG. 1 shows a D.C. to D.C. converter 10 of the type known in the art either as a flyback converter or a ringing choke converter. The converter 10 includes a transformer 12 having like wound primary and secondary windings, 14 and 16, respectively. A PNP oscillating power transistor 18 has its emitter electrode connected to a switch $S_1$, which is serially connected to a low-voltage battery 20, and its collector electrode connected in series to the primary winding 14. By cyclically driving the power transistor 18 into heavy conduction, in the manner explained hereinbelow, the converter 10 operates with self-sustaining oscillations.

A control circuit 22, which is connected to a current regulating device comprising two current sinks, $I_{clamp}$ 26 and $I_{bias}$ 24, respectively, and a high-voltage, flash discharge capacitor 28, provides turn ON and turn OFF control signals to the current sinks 24 and 26. The control circuit 22 forms no part of the present invention and may be selected from circuitry well known in the converter art. A diode 29 is connected in series to the secondary winding 16 for conducting a rectified charging current to charge the capacitor 28.

A feedback path, which consists of a current limiting resistor 30, a diode 32, a capacitor 34, and a diode 36 connected in parallel with a capacitor 38, is connected between a central tap of the secondary winding 16 and the base electrode of the transistor 18. Preferably, as more fully described in commonly assigned, co-pending U.S. patent application Ser. No. 341,948 filed Jan. 19, 1982, entitled Stored Charge Commutation Of A Flyback Oscillating Transistor, the disclosure of which is incorporated herein by reference, the diode 32 has low capacitance and thus low stored charge in the diode's reverse biased direction and high capacitance and thus high stored charge in the diode's forwardly biased direction. The diode's high stored charge provides a large turn-OFF current pulse to the transistor 18 and the discharge current of the capacitor 34 provides a small turn ON current pulse to the transistor 18. Diode 36 and capacitor 36 provide a 0.7 volt drop in the base circuit of the transistor 18.

An NPN clamp transistor 40 has its emitter electrode connected to the current sink 24 and to the cathode terminal of the diode 36, its collector electrode connected to the switch $S_1$, and its base electrode connected to the current sink 26. A resistor 42 is connected between the switch $S_1$ and the base electrode of the transistor 40.

The flyback converter 10 stores energy in the transformer 12 when the transistor 18 is conducting (turned ON). The converter 10 transfers stored energy from the transformer 12 to the capacitor 28 when the transistor 18 is not conducting (turned OFF). Briefly described, the converter 10 operates as follows. When the switch $S_1$ is closed, the control circuit 22 turns ON the current sinks 24 and 26. When the current sink 24 turns ON, current is drawn from the base of the transistor 18 turning it ON. The base of clamp transistor 40 is pulled down at least 1.2 volts from the supply voltage of battery 20 by the voltage drop across resistor 42 due to current sink 26. Because the emitter of clamp transistor 40 is not greater than 1.4 volts below the battery supply voltage (via transistor 18 and diode 36), the clamp transistor remains OFF, allowing the converter 10 to operate.

When the transistor 18 conducts, a current $I_p$ flows from the battery 20 through the primary winding 14 and the transistor 18, which is quickly driven into saturation. Because the transformer windings 14 and 16 are wound in the same direction, the polarity of the voltage across the primary winding 14 and the polarity of the voltage across the secondary winging 16 are the same. When battery current flows in the primary winding so that a voltage is developed across this winding, the polarity of the voltage induced across the secondary winding 16 is such that the diode 29 is biased in the reverse direction. Therefore, when the current $I_p$ flows in the primary winding there is no current in the secondary winding. When current $I_p$ flows in the primary winding, the diode 32 is biased in the forward direction and stores a large charge.

As the current $I_p$ rises towards the battery short-circuit current, the voltage across the primary winding falls and feedback voltage across a control portion 16a of the secondary winding 16 falls in proportion to the turns ratio of the primary winding 14 and the control portion 16a of the secondary winding. When the feedback voltage reaches a level where the base current of the transistor 18 is insufficient to maintain the transistor in the conducting state, the transistor 18 starts to turn OFF.

When the oscillating transistor 18 turns OFF, the current $I_p$ is abruptly terminated. The transformer's magnetic field collapses, in response to the interrupting of $I_p$, and the voltages across the transformer windings 14 and 16 reverse in polarity. At this point, the diode 32 switches from being forwardly biased to being reverse biased. Because the diode 32 has accumulated a large amount of stored charge in the forwardly biased direction, it supplies a large turn-OFF current pulse, when suddenly reverse biased, to the base of the transistor 18. This turn-OFF pulse which is coupled with the discharge current of the capacitor 34 rapidly drives the transistor 18 into cut off.

When the voltage across the secondary winding 16 reaches a level so that diode 29 is forwardly biased, a current $I_s$ begins to flow to charge the capacitor 28. The diode 32 is reverse biased at this time by the voltage across the secondary winding portion 16a.

After the energy stored in the transformer 12 is transferred to the capacitor 28, the voltages across the windings collapse toward zero. When the diode 29 is no longer forwardly biased, $I_s$ terminates. The capacitor 34 and the diode 32 are again charged by the decreasing voltage across the secondary winding portion 16a and provide a turn ON pulse to the base of transistor 18 and the cycle is repeated. Because the diode 32 has been in the reverse bias state where it has low capacitance, it contributes minimally to the current pulse provided to the base of the transistor 18 by the capacitor 34. Thus the turn ON current pulse, which is largely supplied by the capacitor 34, is of much smaller magnitude than the turn OFF pulse.

When the capacitor 28 has been charged to the desired voltage level, the control circuit 22 turns OFF the current sinks 24 and 26. When $I_{bias}$ 24 turns OFF, transistor 18 is turned OFF. With a properly sized series resistor 42, i.e. large enough to pull the base voltage of clamp transistor 40 down by at least 1.2 volts and yet small enough to provide effective clamping, the clamp transistor 40 clamps off the converter and then assumes a standby state (i.e. non-conductive, but ready to be momentarily enabled by a noise pulse of sufficient magnitude and proper polarity).

If circuit noise of negative polarity and sufficient magnitude occurs at the base of the transistor 18, it turns ON. The negative noise is also capacitively coupled through the capacitor 38 to the emitter electrode of clamp transistor 40, thereby turning it ON. However, when the transistor 40 is ON, the voltage drop across the emitter-base junction of the transistor 18 and the diode 36 is limited by the collector-emitter voltage of the transistor 40. If the voltage $V_{clamp}$ applied to the circuit node 44 is less than 1.4 volts, then the $V_{BE}$ of the transistor 18 will be clamped at a low level that is insufficient to drive the transistor 18 into heavy conduction.

$$V_{clamp} = V_1 + I_R \times R_{42}/\beta$$

where $V_1 = V_{BE}$ of transistor 40 (0.7 volts)
$I_R = I_{Run}$ of Converter 10
$\beta$ = the current gain or transistor 40.

By choosing a small resistor 42, $V_{clamp}$ will be less than 1.4 volts and the $V_{BE}$ of transistor 18 will be clamped to a fraction of a volt.

When the aforementioned noise terminates, the clamp transistor 40 again assumes the standby state. The transistor 18 also turns OFF, preventing further charging of the capacitor 28, because the diode 32 and capacitors 34 and 38 are only marginally charged to a level which is insufficient for self oscillation.

Figure 2:
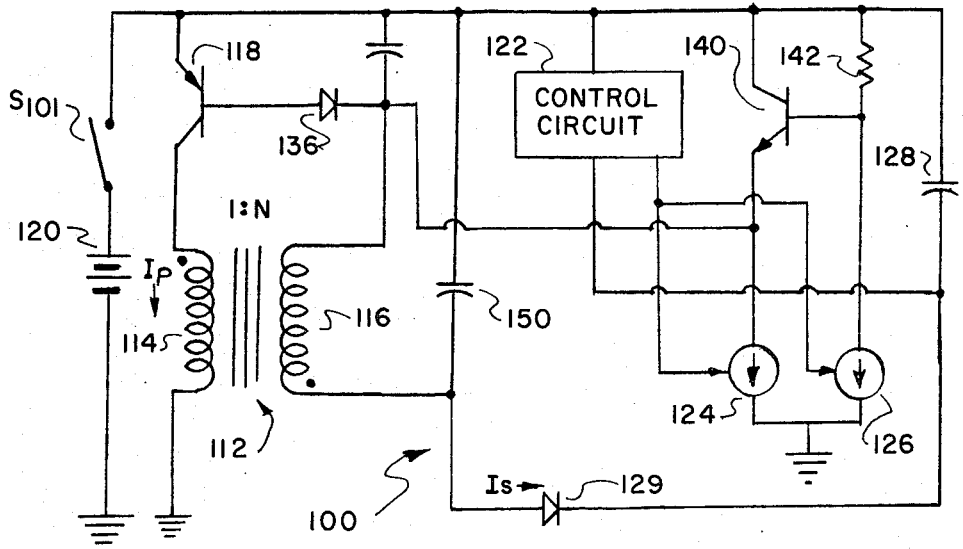
FIG. 2 is a schematic circuit diagram of a battery powered step-up D.C. to D.C. converter having a turn on/off control according to the invention.

FIG. 2 shows the clamp device of FIG. 1 incorporated in a D.C. to D.C. converter 100 of the type known in the art either as a step-up converter or a core-saturating converter. The converter 100 includes a transformer 112 having a primary winding 114 and a secondary winding 116. A PNP oscillating power transistor 118 has its emitter electrode connected to battery 120 through a switch $S_{101}$, its base electrode connected in series to the anode of a diode 136, and its collector electrode connected to the transformer primary 114.

When switch $S_{101}$ is closed, control circuit 122 turns ON the current sinks $I_{clamp}$ 126 and $I_{bias}$ 124. When the current sinks 124 and 126 turn ON, current is drawn from the base of transistor 118, turning it ON and causing current to flow from low voltage battery 120 through primary winding 114. The base of a clamp transistor 140 is pulled down at least 1.2 volts from the supply voltage of battery 120 by the current sink 126. Since the emitter of clamp transistor 140 is not greater than 1.4 volts below the battery supply voltage, the clamp transistor remains OFF, allowing the converter 100 to operate.

When current sink 124 turns on, it provides a bias current to turn on transistor 118. As this occurs, the voltage across primary winding 114 rises, inducing N times this voltage across secondary winding 116, where N is the transformer turns ratio. When the secondary voltage reaches the voltage on storage capacitor 128 plus the voltage drops across diodes 129 and 136 and transistor 118, a base current path is established for secondary current $I_S$, and transistor 118 saturates. When saturated, the transistor base current equals 1/N times its collector current.

More or less battery current is drawn, depending on how much voltage from secondary winding 116 is fed back through the primary winding 114, with current decreasing as capacitor (and feedback) voltage increases.

Primary current flows until transformer 112 saturates, at which time the winding voltages decrease toward zero. At this point, the energy stored in the core causes the transformer 112 to ring (tuned by capacitor 150 and the inductance of secondary 116). Charging current ceases as diode 129 is reverse biased.

At the end of a half-cycle of ring, transistor 118 again is turned on and oscillation continues.

When the capacitor 128 has been charged to the desired voltage, the control circuit 122 turns OFF current sinks 124 and 126. Again, with proper selection of the size of the series resistor 142, transistor 140 will clamp off the converter and then assume a standby state in which it draws no power. If a noise pulse of negative polarity and sufficient magnitude occurs at the base of transistor 118, transistors 118 and 140 turn ON and the base-emitter voltage of transistor 118 is clamped at a level which is insufficient to drive the transistor 118 into heavy conduction. With the base drive to the transistor 118 clamped at a low level, the converter again turns OFF when the noise pulse terminates and the clamp transistor 140 again assumes the stand-by state.

Figure 3:
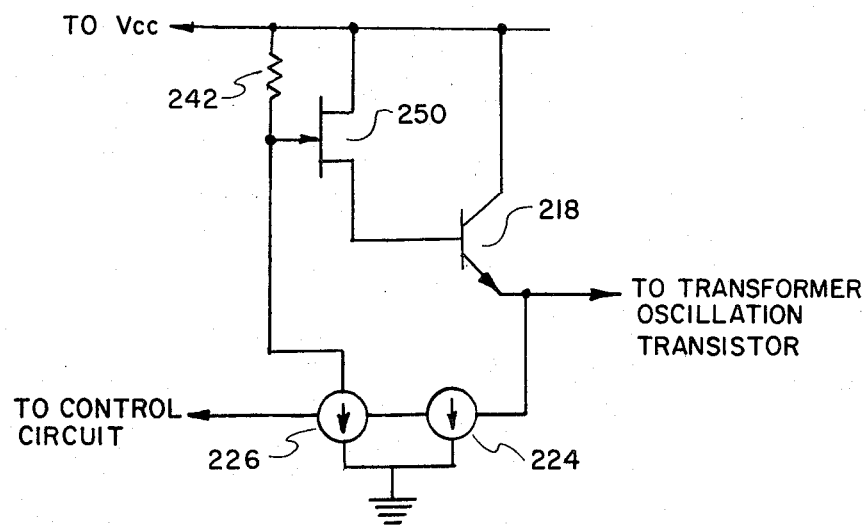
FIG. 3 is a schematic circuit diagram of another embodiment of a turn on/off control for a battery powered D.C. to D.C. converter.

FIG. 3 shows a clamp device having JFET 250 connected in Darlington configuration to the clamp transistor 218. The use of a JET has the advantage of allowing the use of a low current $I_{clamp}$ current sink 226.

Figure 4:
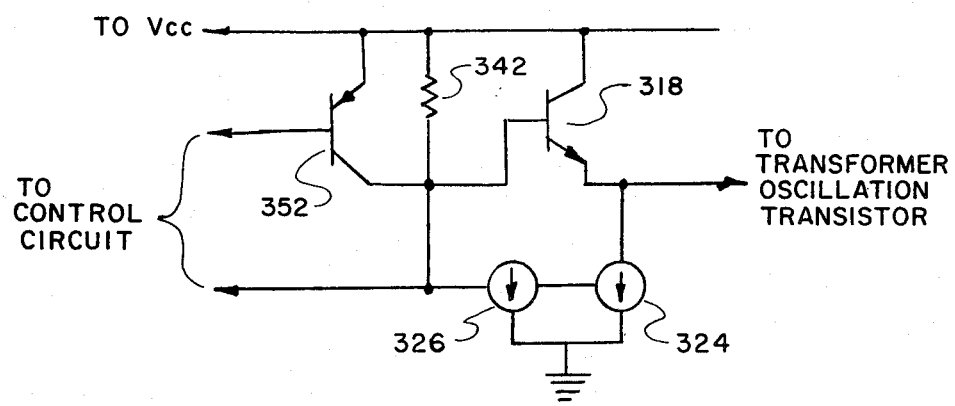
FIG. 4 is a schematic circuit diagram of still another embodiment of a turn on/off control for a battery powered D.C. to D.C. converter.

FIG. 4 shows a clamp device having an additional PNP driver transistor 352 coupled between the base circuit of a clamp transistor 318 and the transformer oscillating transistor (not shown). The transistor 352 provides a very low impedance temporary clamp pulse to the oscillating transistor, which in turn provides very rapid turn OFF of the converter.

The invention has been described in detail with particular reference to preferred embodiments thereof, but it will be understood that variations and modifications can be affected within the spirit and scope of the invention.

What is claimed is:

1. In a D.C. to D.C. converter adapted to be energized by a power supply, the converter comprising a transformer including a primary winding and a secondary winding, a capacitor coupled to the secondary winding for accumulating electric energy, first transistor switching means having a base electrode and an emitter electrode, the switching means being coupled in series with the power supply and the primary winding for periodically interrupting power supply current to the primary winding, and a control circuit for detecting the charge status of the capacitor, the control circuit being arranged to produce a converter ON signal and a converter OFF signal, the improvement comprising:

second transistor switching means having a base electrode, a collector electrode and an emitter electrode;

current regulating means connected between the control circuit and the base electrode of said second transistor switching means, said current regulating means being adapted to assume a first state in response to the converter ON signal and a second state in response to the converter OFF signal;

semiconductor means connected between the base electrode of the first transistor switching means and the emitter electrode of said second transistor switching means, and providing a first predetermined voltage at the emitter electrode of said second transistor switching means when said current regulating means assumes its first state; and a resistor connected between the power supply and the junction between the base electrode of said second transistor switching means and said current regulating means, the size of said resistor being such that (1) when said current regulating means is in said first state a second predetermined voltage is developed at the base electrode of said second transistor switching means, the difference between said first and second voltages rendering said second switching means non-conductive, and (2) when said current regulating means is in said second state, the first transistor switching means is turned off and said second transistor switching means assumes a stand-by state in which electrical noise of a particular polarity and sufficient magnitude may cause the first and second transistor switching means turn on, but in which the voltage drop across the emitter-base junction of the first transistor switching means is clamped by the collector-emitter voltage of the second transistor switching means at a low level that is insufficient to drive the first transistor switching means into heavy conduction, whereby the first transistor switching means turns off once such noise terminates.

2. The converter according to claim 1 further comprising a JFET connected in a Darlington configuration to the second transistor switching means.

3. The converter according to claim 1 further comprising a PNP transistor having its emitter electrode connected to the power supply, its collector electrode connected to the base electrode of the second transistor switching means and its base electrode connected to the control circuit.

4. The converter according to claim 1 wherein said semiconductor means comprises a diode, said first transistor switching means comprises a PNP transistor having its base electrode connected to said diode, and said second transistor switching means comprises an NPN transistor having its collector electrode connected to the power supply, its emitter electrode connected to said diode and to said current regulating means and its base electrode connected to said current regulating means.

5. The converter according to claim 4 wherein said current regulating means comprises a first current sink connected to the emitter electrode of said NPN transistor and a second current sink connected to the base electrode of said NPN transistor.

* * * * *